United States Patent Office 3,522,348
Patented July 28, 1970

3,522,348
CRYSTALLINE SULFUR - CONTAINING
GLYCOLIPID AND METHOD FOR OB-
TAINING THE SAME
Yasunao Ogawa and Atsushi Kurosawa, Osaka Prefecture, and Haruo Nishimura, Hyogo Prefecture, Japan, assignors to Shionogi & Co., Ltd., Osaka, Japan
No Drawing. Filed June 9, 1967, Ser. No. 644,818
Claims priority, application Japan, June 14, 1966, 41/38,743
Int. Cl. A61k 17/00
U.S. Cl. 424—95
1 Claim

ABSTRACT OF THE DISCLOSURE

A crystalline sulfur-containing glycolipid being useful as a medicament having protective effects against various infections with pathogenic microorganisms and some other physiologically or pharmacologically beneficial effects, and a method for obtaining the same from animal tissues by solvent extraction and crystallization.

---

This invention relates to a crystalline sulfur-containing glycolipid. In particular, it relates to a crystalline sulfur-containing glycolipid being useful as a medicament which has protective effects against various infections with pathogenic microorganisms and some other physiologically or pharmacologically beneficial effects. The present invention relates also to a method for obtaining the said sulfur-containing glycolipid from animal tissues by combination of solvent extraction and crystallization.

Hitherto, potassium salt of cerebroside sulfate which was isolated by G. Blix has been known as a non-crystalline sulfur-containing glycolipid [G. Blix: Z. Physiol. Chem., 219, 82 (1933)]. It was also proposed that its constituents are sphingosine, cerebronic acid, galactose, sulfuric acid and potassium. However, no crystalline sulfur-containing glycolipid as that of the present invention has been known. Further, it has been confirmed by the present inventors that the crystalline sulfur-containing glycolipid of the present invention differs physically as well as chemically from any known cerebroside, i.e. the former is hardly soluble in water whereas the latter is easily soluble and the main basic constituent of the former is dihydrosphingosine whereas that of the latter is sphingosine. On these facts, the crystalline sulfur-containing glycolipid can be deemed to be a new composition of matter. On the other hand, the physiological or pharmacological properties of sulfur-containing glycolipid have never been reported, probably because of difficulties in isolation and purification of the same. The present inventors have now discovered that the newly isolated crystalline sulfur-containing glycolipid exerts various beneficial medicinal effects and can be used as a medicament. Moreover, the present inventors have discovered that the crystalline sulfur-containing glycolipid can be efficiently and advantageously obtained by a simplified procedure which comprises essentially solvent extraction and crystallization. The present invention has been founded on the bases of these discoveries.

Accordingly, an object of the present invention is to provide a new crystalline sulfur-containing glycolipid. Another object of the invention is to provide a new crystalline sulfur-containing glycolipid showing medicinal activities. A further object of the invention is to provide a new and simplified method for obtaining the crystalline sulfur-containing glycolipid from animal tissues. These and other objects and the manner in which they are accomplished will become apparent to those conversant with the art from the following description of the new substance as well as general and specific methods for obtaining the same.

According to the present invention, the objective lipid can be obtained by (1) extraction of crude sphingolipid fraction from animal tissues containing sulfur-containing glycolipid with a solvent capable of dissolving glycolipid, (2) elimination of non-lipid and polyglyco-lipid contaminants, (3) distribution of the remaining sphingolipid fraction between the two phases of a solvent system consisting of an aqueous lower alkanol and a lower halogenoalkane containing a lower alkanol to separate the objective lipid in a crystalline form from the aqueous lower alkanol layer and, if necessary, (4) recrystallization.

The animal tissue as the raw material of the present method may be any one so far as it contains the sulfur-containing glycolipid. However, the normal mammalian brain is a most preferred material, since the nervous tissues are generally rich in the sulfur-containing glycolipid. More particularly, brains of cattles, horses, rabbits, dogs, cats, guinea pigs, rats and mice can be conveniently employed.

In the first step, crude sphingolipid fraction is separated from the raw animal tissues. For this purpose, the animal tissues are extracted with a solvent capable of dissolving glycolipid under mild heating, preferably at a temperature from about 30° C. to about 60° C., and the extract is cooled to about 0° C. to about 5° C. to precipitate crude sphingolipid fraction, whereby the non-lipid contaminants and the phospholipids (mainly glycerophospholipid) are retained in the mother liquor. If necessary, the extract may be concentrated under reduced pressure prior to cooling. As illustrative of the solvent capable of dissolving glycolipid are lower alkanol, pyridine, dimethylformamide, dimethylsulfoxide and the like. Especially, lower alkanol is preferred, because it is convenient for the precipitation of the crude sphingolipid fraction.

In the second step, the thus obtained crude sphingolipid fraction is purified by elimination of non-lipid and polyglyco-lipid contaminants. The non-lipid contaminants (mainly cholesterol) are removed by washing the crude sphingolipid fraction with a non-polar or less-polar solvent such as petroleum ether, ether, acetone or the like. Subsequently, the crude sphingolipid fraction is washed with water to remove polyglyco-lipid contaminants (mainly ganglioside). For this purpose, the fraction may be directly washed with water. But it is more preferred that a solution or suspension of the fraction in a suitable organic solvent such as a mixture of a lower halogenoalkane (e.g. methylene chloride, chloroform, trichloroethane) and a lower alkanol (e.g. methanol, ethanol) is shaken with water, because the polyglyco-lipid contaminants are easily soluble in water containing a lower alkanol.

In the third step, the thus purified sphingolipid fraction is subjected to a distribution between the two phases of a solvent system. The distribution of this step is favorably executed in a lower halogenoalkane-lower alkanol-water system. The sphingolipid fraction is dissolved in a mixture of a lower halogenoalkane and a lower alkanol and the solution is shaken with a mixture of a lower alkanol and water. As illustrative of the lower halogenoalkane are methylene chloride, chloroform, trichloroethane and the like, and as illustrative of the lower alkanol are methanol, ethanol and the like. By this treatment, the objective lipid is distributed in the upper layer constituted for the most part by water and gradually separated as needle-like crystals when allowed to stand at a room temperature (about 20° C.) or a cold place (about 10° C. to about −30° C.). If necessary, the crystals may be further purified by recrystallization from a suitable solvent such as a mixture of a lower halogenoalkane, a lower alkanol and water.

The thus purified sulfur-containing glycolipid is constituted by colorless needle-like crystals and shows one spot on the thin-layer chromatogram. It has the following elementary analytical data:

| | Percent |
|---|---|
| Carbon | 58.33 |
| Hydrogen | 9.76 |
| Nitrogen | 1.68 |
| Sulfur | 3.16 |
| Potassium | 4.00 |
| Phosphorus | 0.00 |

The lipid has a molecular weight of 838 when determined by the vapor pressure lowering method. The lipid has an apparent melting point of 194–196° C. (decomposition). The optical rotation of the lipid, when dissolved in pyridine, is $[\alpha]_D^{25} = +7.9°$ (c.=0.5). The infra-red absorption spectrum of the lipid was determined by means of potassium bromide tablet. Among the characteristic frequencies are the following: 3430, 2940, 2870, 1650, 1540, 1470, 1240, 1150, 1070, 990, 820, 725 cm.$^{-1}$. The lipid is soluble in chloroform-methanol (2:1, v./v.), pyridine and dimethylformamide when heated and very difficultly soluble in methanol, ethanol, acetone, ether, petroleum ether, hexane, dioxane, chloroform, carbon tetrachloride, ethyl acetate, benzene, glacial acetic acid, aqueous sodium hydroxide, hydrochloric acid and water.

The constituents of the lipid were determined by gas-chromatography after methanolysis in the presence of hydrogen chloride as follows.

| | Percent |
|---|---|
| Sugar: | |
| Galactose | 18 |
| Fatty acid: | |
| 2-hydroxy-fatty acid of— | |
| $C_{20}$ | 3 |
| $C_{22}$ | 35 |
| $C_{23}$ | 13 |
| $C_{24}$ | 47 |
| Base: | |
| Sphingosine | 15 |
| Dihydrosphingosine | 85 |

The crystalline sulfur-containing glycolipid, according to the present invention, is useful as a medicament, particularly for prevention or treatment of various bacterial infections. Namely, injection by intraperitoneal route of the crystalline lipid elicits in mice a high level of protection against bacterial infections. For instance, the results presented in the following table confirm a finding that pretreatment with the lipid exhibits significant protective activity against *Klebsiella pneumoniae* infection in mice when administered intraperitoneally one day prior to challenge.

TABLE.—PROTECTIVE EFFECT OF LIPID ON SUSCEPTIBILITY OF MICE TO *KLEBSIELLA PNEUMONIAE* INFECTION.

| Amount of lipid[1] injected intraperitoneally, mcg./g. | Interval between treatment and infection, day | Cumulative deaths at indicated days (d) after infection[2] | | | |
|---|---|---|---|---|---|
| | | 2 d | 3 d | 6 d | 10 d |
| 50 | 1 | 1 | 4 | 6 | 7 |
| 100 | 1 | 0 | 5 | 5 | 5 |
| 200 | 1 | 0 | 4 | 5 | 5 |
| 0 (gum arabic) | 1 | 5 | 10 | | |

[1] Emulsified with gum arabic.
[2] Intraperitoneal injection, 10$^{-7}$ mg./mouse.

Moreover, the results presented in this table make clear that interaperitoneal injection of the lipid can increase the resistance of mice to bacterial infections.

In addition, since the lipid shows particular affinities against neurotransmitters such as acetylcholine, choline, adrenaline or noradrenaline or neurotransmission-blocking agents such as d-tubocurarine or N-(2-chloroethyl)-dibenzylamine hydrochloride, it can be used as a prolongation agent of the said agents.

Furthermore, the toxicity of the lipid is so extremely low that it can be used as a medicament having no considerable side actions. It can be administered in a variety of per se conventional ways, e.g. in the form of tablets, each constituted e.g. by 10–500 mg. of the lipid and a certain proportion of a per se conventional carrier.

The following example will represent a presently-preferred embodiment of the present invention, but it is to be understood that the example is given by way of illustration only and not of limitation.

EXAMPLE

Separation of crude sphingolipid fraction

To brain (100 g.) of rats is added pure methanol (1 l.), homogenized and gradually heated to 40° C. The insoluble materials are removed by filtration and the filtrate is allowed to stand overnight at 0–3° C. The white precipitates are collected by filtration, washed with acetone and dried to give the crude sphingolipid fraction (1.5 g.) as a wax-like substance.

Elimination of polyglyco-lipid

The above separated crude sphingolipid fraction (1.2–1.6 g.) is suspended in a mixture of chloroform and methanol (2:1, v./v.) so as to make the total volume 35 ml. To the suspension is added distilled water (4.9 ml.), the mixture is vigorously shaken for 10 minutes and the separated clear upper layer is discarded.

Separation and crystallization of the sulfur-containing glycolipid

To the above separated lower layer (30 ml.) is added a mixture (20 ml.) of methanol and water (45:55, v./v.). The mixture is vigorously shaken for 10 minutes and allowed to stand at 20° C. for 4–10 days with a tight stopper. Two phases of the solvent are separated, and the objective crystalline sulfur-containing glycolipid is separated from the clear upper layer as needle-like crystals. The crystals are collected by filtration, washed with a mixture of chloroform, methanol and water and pure acetone, and dried to give the objective lipid (10 mg.). Yield, 100 mg./kg. of brain of rats.

In this procedure, when the separated upper layer is allowed to stand at −20° C., the crystallization of the objective lipid can be completed within 1–2 days.

When brains of cattle and dogs are employed as the raw materials, yields of 20 mg./kg. and 60 mg./kg. are achieved, respectively.

Recrystallization of the sulfur-containing glycolipid

A mixture of chloroform-methanol (2:1, v./v.) and water in a ratio of 88:12 (v./v.) is shaken, centrifugalized and the upper layer is discarded. In the lower layer (75 ml.) are suspended the crude crystals (50 mg.) and a mixture (50 ml.) of methanol and water (45:55, v./v.) is added. The mixture is vigorously shaken for 10 minutes, and centrifugalized. The clear upper layer is separated and allowed to stand at 20° C. After several hours the objective pure lipid is separated as colorless needles, which are collected by filtration and dried. The yield of the recrystallization is about 50%.

What is claimed is:
1. A method for obtaining crystalline sulfur-containing glycolipid which comprises the steps of:
(a) extracting a crude sphingolipid fraction from mammalian brains with pure methanol at the ratio of 1 l. of methanol per 100 g. of brains at a temperature from about 30° C. to about 60° C.;
(b) cooling the extract to a temperature from about 0° C. to about 5° C.;
(c) washing the precipitated sphingolipid fraction with acetone;
(d) suspending the resultant sphingolipid fraction in a mixture of chloroform and methanol (2:1, v./v.) at the concentration of about 1.2–1.6 g. of the said fraction per 35 ml. of the total volume of the said suspension;

(e) shaking the suspension with water at the ratio of 5 ml. of water per 35 ml. of the suspension, thereby forming an upper aqueous layer and a lower layer;
(f) discarding the aqueous upper layer;
(g) shaking the lower layer, thus obtained, with a mixture of methanol and water (45:55, v./v.) at the ratio of 20 ml. of the mixture per 30 ml. of the said lower layer; thereby forming two distinct liquid layers; and
(h) separating and allowing the upper layer to stand at a temperature from about −30° C. to about 20° C. to separate the objective sulfur-containing glycolipid as needle-like crystals.

References Cited

Lees, M. et al.: A Simple Procedure for the Preparation of Brain Sulphatides, J. Neurochemistry, vol. 4, pp. 9–18 (1959).

Folch, Jordi et al.: A Simple Method for the Isolation and Purification of Total Lipids From Animal Tissues, J. Biol. Chem., vol. 226, pp. 497–509.

ALBERT T. MEYERS, Primary Examiner

J. D. GOLDBERG, Assistant Examiner